United States Patent
Hand

(10) Patent No.: US 6,259,029 B1
(45) Date of Patent: Jul. 10, 2001

(54) CABLE GLAND

(75) Inventor: Edward Hand, Stalybridge (GB)

(73) Assignee: Hawke Cable Glands Limited (GB)

( * ) Notice: Subject to any disclaimer, the term of this patent is extended or adjusted under 35 U.S.C. 154(b) by 0 days.

(21) Appl. No.: 09/274,422

(22) Filed: Mar. 19, 1999

(30) Foreign Application Priority Data

Mar. 27, 1998 (GB) .................................................. 9806483

(51) Int. Cl.⁷ .................................................. H02G 15/02
(52) U.S. Cl. ...................................... 174/74 R; 174/74 A
(58) Field of Search ............................... 174/74 R, 74 A, 174/75 B, 77 R, 80, 84 R

(56) References Cited

U.S. PATENT DOCUMENTS

| 2,145,705 | 1/1939 | Wodtke | 173/264 |
|---|---|---|---|
| 4,273,405 | * 6/1981 | Law | 339/94 R |
| 4,515,991 | * 5/1985 | Hutchison | 174/65 SS |
| 5,059,747 | * 10/1991 | Bawa et al. | 174/65 SS |
| 5,310,963 | * 5/1994 | Kennelly | 174/65 SS |
| 5,589,663 | * 12/1996 | Wales | 174/51 |
| 5,621,191 | * 4/1997 | Norris et al. | 174/65 SS |
| 5,691,505 | * 11/1997 | Norris | 174/51 |
| 5,951,327 | * 9/1999 | Marik | 439/610 |

FOREIGN PATENT DOCUMENTS

| 2 691 852 | 12/1993 | (FR) . |
|---|---|---|
| 2 276 777 | 10/1996 | (GB) . |
| 05083823 | 8/1993 | (JP) . |

* cited by examiner

Primary Examiner—Kristine Kincaid
Assistant Examiner—William H Mayo, III
(74) Attorney, Agent, or Firm—Cantor Colburn LLP

(57) ABSTRACT

A removable cap is provided to cover temporarily the end of a cable during assembly of a cable gland to protect an elastomeric seal from contact with sharp conductor cores.

20 Claims, 3 Drawing Sheets

CABLE GLAND

BACKGROUND OF THE INVENTION

This invention relates to cable glands.

Cable glands for connecting an electric cable to a piece of equipment such as a junction box are known for use in hazardous environments to provide a sealed entry for the cable to contain any explosion occurring within the equipment.

The seal may be of the compression type in which relative rotation of two threadably engaged parts of the gland compresses the seal inwardly to bear onto the surface of the cable. This type of seal has to be matched to the size of the cable and use of the incorrect seal can result in poor sealing efficiency. In addition, the compression force can result in the surface of the cable becoming deformed with subsequent loss of sealing efficiency if the gland is taken apart for inspection and then re-assembled.

These problems are largely avoided by a diaphragm type of seal in which an opening in the seal adapts automatically to different sizes of cable. A cable gland with this type of universal seal is the subject matter of our granted UK Patent No. 2276777-B.

We have now found, however, that during assembly of such glands having a universal seal, the marginal edge of the opening in the seal can be damaged by contact with the sharp conductor cores and/or rough edges of the cut end of the cable sheath as it is pushed through the opening. Such damage reduces sealing efficiency and, in certain cases, the seal may not meet safety requirements requiring the seal to be replaced which is time consuming.

The same problem can arise but usually to a lesser extent with seals of the compression type. For this reason, it has been the practice, whichever type of seal is used, to cover the cut end of the cable with an adhesive tape to reduce the risk of damage to the seal. Often the glands are assembled in conditions of restricted space and/or visibility with the result that the taping of the cut end of the cable and subsequent removal of the tape is awkward and adds considerably to assembly time.

The present invention has been made from a consideration of the foregoing problems and disadvantages of known cable glands.

SUMMARY OF THE INVENTION

It is a primary object of the present invention to provide a cable gland in which damage to the seal(s) by the cut end of the cable is substantially avoided in a simple, effective manner without taping the cut end of the cable.

According to the present invention there is provided in or for a cable gland, a cap member for the cut end of a cable, the cap member being constructed and arranged to pass with the cable through a seal in the gland and thereafter to be removable from the cable.

As will be appreciated, the cap member facilitates passage of the cable through the seal and prevents the seal being damaged by the cut end of the cable in a simple, effective manner which avoids taping the cut end of the cable.

The seal may be of the universal type with the cap member being appropriately dimensioned for use with any selected one of a range of different cable sizes and types.

The cap member may be made of any material having the required flexibility and strength to pass with the cable through the seal without tearing. For example, the cap member may be made from appropriate plastics or paper materials.

The invention will now be described in more detail by way of example only with reference to the accompanying drawings.

DETAILED DESCRIPTION OF THE EXEMPLARY EMBODIMENT

Figure 1:
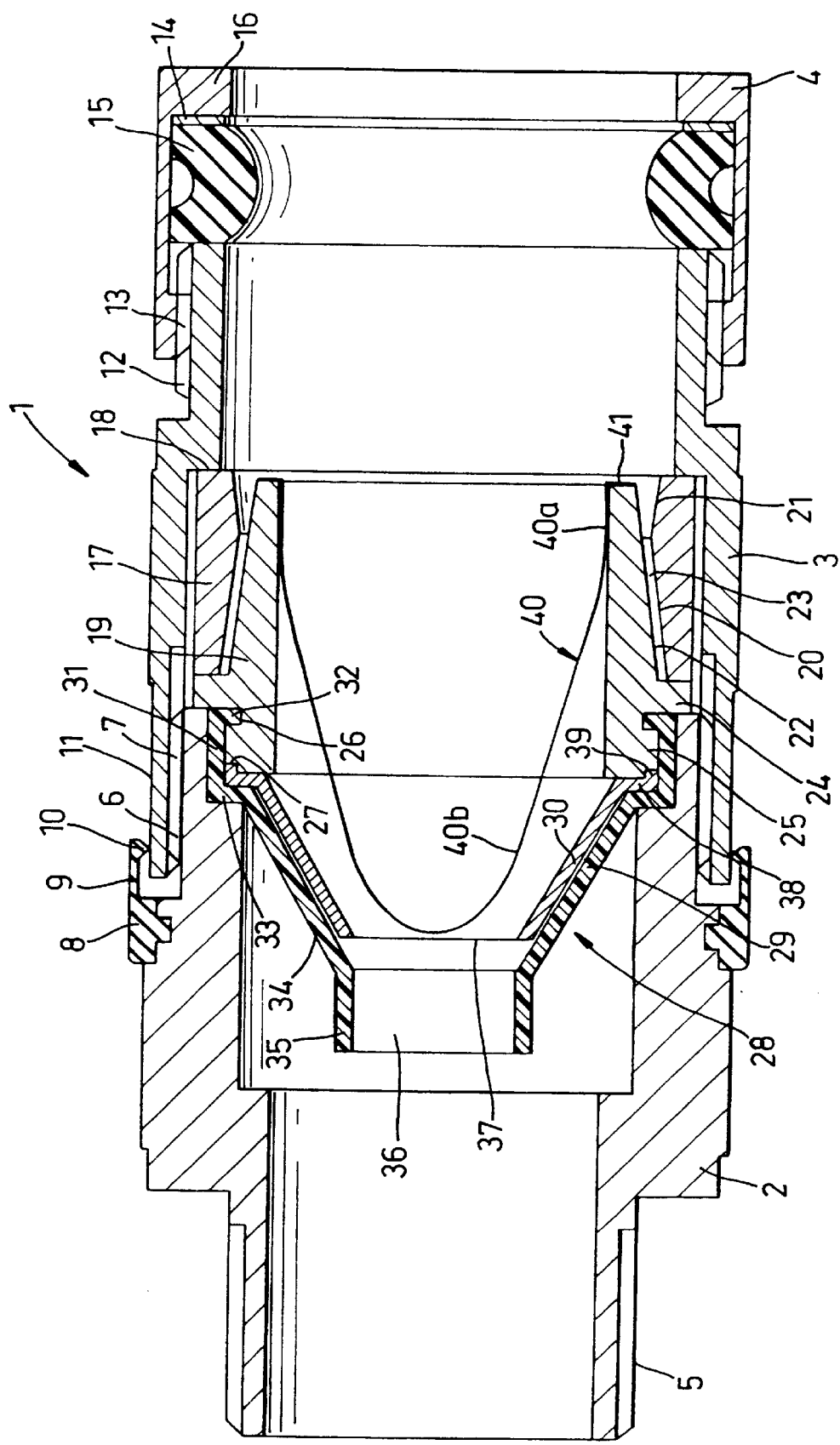
FIG. 1 is a longitudinal section through a cable gland embodying the invention.

The cable gland 1 shown in FIG. 1 of the accompanying drawings comprises an entry body 2, a middle nut 3 and a cap nut 4.

The entry body 2 has an external screw thread 5 at one end for engagement with a tapped hole in a junction box (not shown) or similar piece of equipment.

The other end of the entry body 2 has an external screw thread 6 for engagement with a complementary internal screw thread 7 at one end of the middle nut 3.

An external boot seal 8 mounted on the entry body 2 behind the screw thread 6 has a tubular body 9 with an internal lip 10 at the free end.

The lip 10 co-operates with a cylindrical outer surface 11 of the middle nut to prevent water penetration to the interior of the gland 1 via the engaged screw threads 6,7 in the assembled gland 1.

The other end of the middle nut 3 has an external screw thread 12 for engagement with an internal screw thread 13 of the cap nut 4.

A washer 14 and a cable seal 15 of neoprene or similar elastomeric material are located within the cap nut 4. The washer 14 is arranged between the seal 15 and an inward lip 16 at the outer end of the cap nut 4.

The seal 15 is compressed between the washer 14 and the end of the middle nut 3 to contract inwards to bear against a cable extending through the gland 1 on tightening the cap nut 4 during assembly of the gland 1.

An armour clamping ring 17 abuts against an internal shoulder 18 within the middle nut 3 and is co-operable with a ferrule 19 seated against the end of the entry body 2 to clamp cable armour therebetween on tightening the middle nut 3 during assembly of the gland 1.

In this embodiment, the clamping ring 17 has oppositely inclined internal taper surfaces 20,21 of different axial length and is reversible during assembly of the gland 1 to present either of the taper surfaces 20,21 for co-operation with a complementary external taper surface 22 of the ferrule 19 to vary the size of an annular gap 23 therebetween for clamping cable amour of different thicknesses in the assembled gland 1.

The ferrule 19 has an external collar 24 which abuts against the end of the entry body 2 in the assembled gland 1 and separates the taper surface 22 from a cylindrical tail portion 25 received in the entry body 2.

The tail portion 25 locates and retains a diaphragm seal assembly 28 for accommodating a range of cable sizes and types. The diaphragm seal assembly 28 comprises a seal 29 of neoprene or similar elastomeric material and a washer 30 of nylon or similar plastics material providing a backing or support for the seal 29.

The seal 29 has a tubular outer portion 31 with an internal lip 32 at one end and a radial flange 33 at the other end leading to a tapered centre portion 34 terminating in a cylindrical inner portion 35 defining a through bore 36 for a cable extending through the gland 1.

The washer 30 is of frusto-conical shape complementary to the tapered centre portion 34 of the seal with a central aperture 37 for passage of a cable extending through the gland 1 and a radial flange 38 at the wider end terminating in an axial lip 39. The washer 30 is received within the seal 29 and seats against the centre portion 34 and the radial flange 33.

The assembly of the seal 29 and washer 30 is connected to the tail portion 25 of the ferrule 19 by locating the lip 32 of the outer portion 31 of the seal 30 in the recess 26 adjacent to the collar 24.

The washer 30 is centred within the seal 29 by locating the lip 29 in the recess 27 at the outer end of the tail portion 25 so that the aperture 37 in the washer 30 is coaxial with the bore 36 in the inner portion 35 of the seal 29.

The aperture 37 in the washer 30 is of larger diameter than the bore 36 of the centre portion 35 of the seal 29 and the washer 30 is provided with radial slits (not shown) extending from the marginal edge of the aperture 37 to allow the washer 30 to deform with the seal 29 to accommodate cables of different sizes.

Extending within the ferrule 19 towards the seal assembly 28 is a cap member 40 of a thin plastics material of generally uniform thickness which is flexible and resistant to tearing.

The cap member 40 has a cylindrical base portion 40a and a tapered head portion 40b. The base portion 40a seats in the ferrule 19 and terminates in a radial flange 41 at the open end that abuts against the outer end of the ferrule 19 remote from the seal assembly 28 to temporarily locate and retain the cap member 40 in position in the preassembled gland with the head portion 40b behind the seal assembly 28. In this way, the cap member 40 can receive any selected one of the range of different sizes and types of cable compatible with the seal assembly 28.

Figure 2:
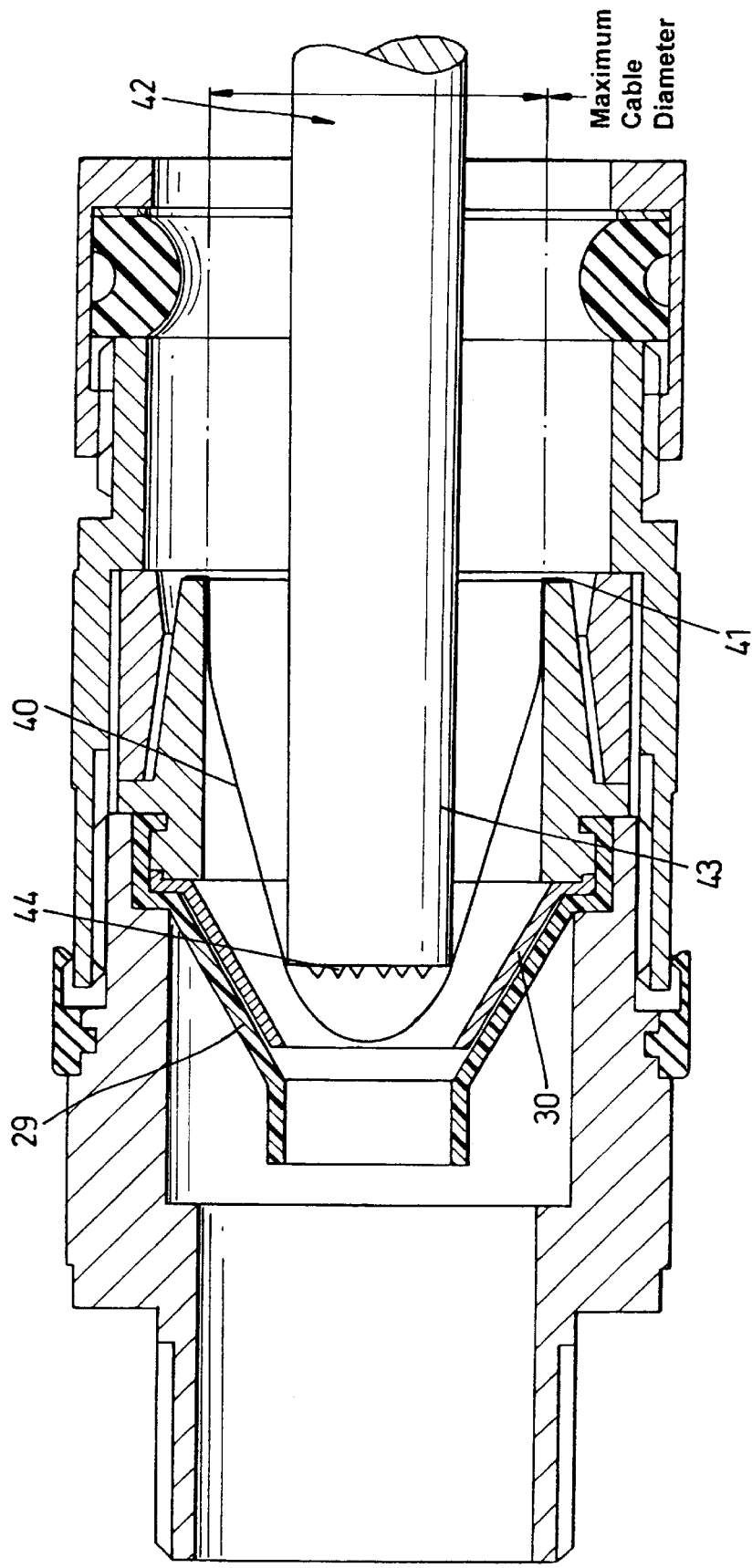
FIG. 2 is a longitudinal section similar to FIG. 1 showing the cut end of a cable received in the cap member.
Figure 3:
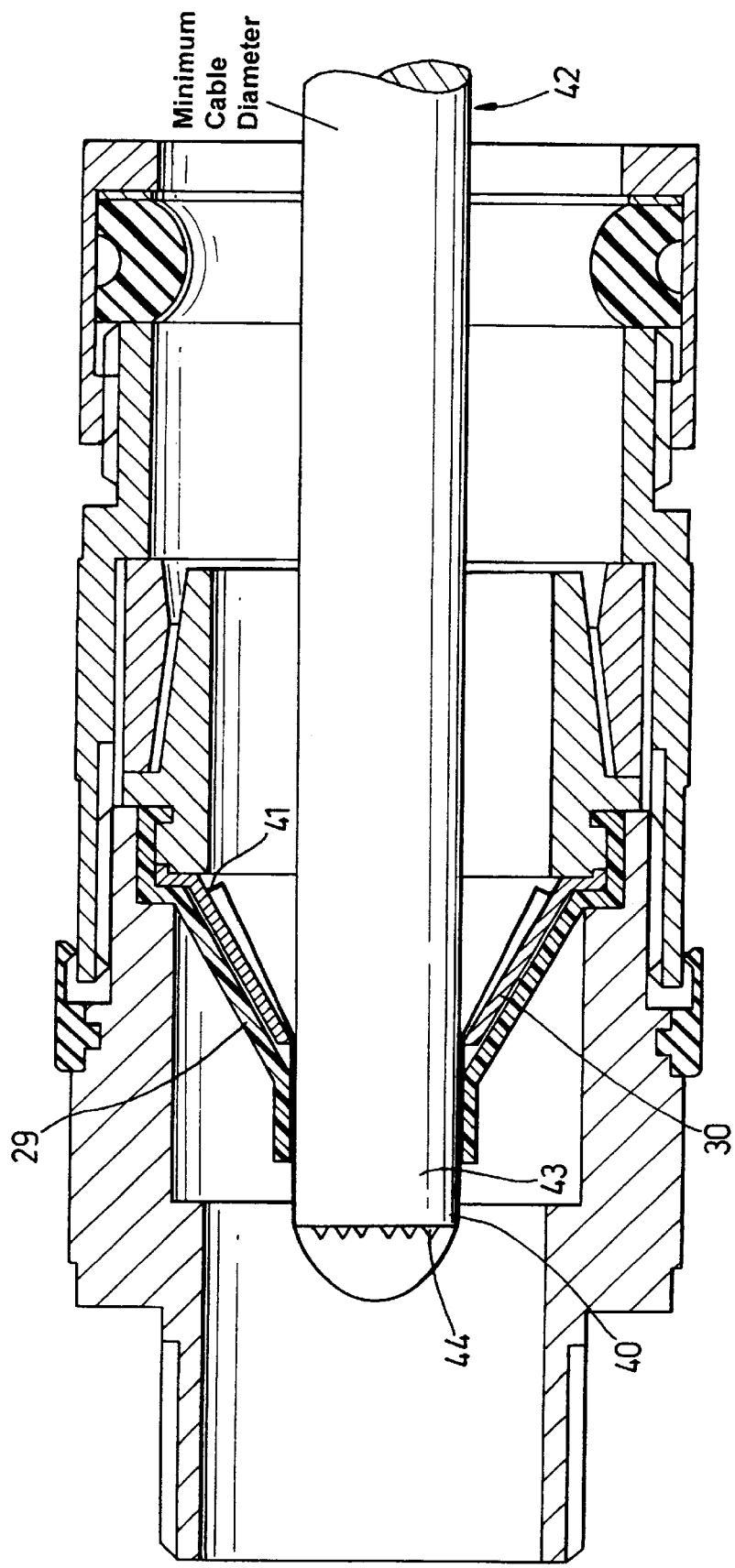
FIG. 3 is a longitudinal section similar to FIG. 2 showing passage of the cut end of the cable with the cap member through a diaphragm seal.

With reference now to FIGS. 2 and 3 of the accompanying drawings, these show the operation of the cap member 40 during passage of a cable 42 through the gland 1 shown in FIG. 1 for connection to a piece of electrical equipment.

The cable 42 is first prepared by cutting back the outer sheath (not shown) and cable armour (not shown) to expose a suitable length of the inner sheath 43 surrounding the conductor cores 44. The inner sheath 43 is then inserted into the entry end of the pre-assembled gland 1 for reception in the cap member 40 as shown in FIG. 2.

As the cable 42 is pushed further into the gland 1, the cap member 40 is released from engagement with the ferrule 19 and passes with the cable 42 through the seal assembly 28 as shown in FIG. 3. As a result, the seal 29 and washer 30 are protected by the cap member 40 from damage caused by the cut end of the inner sheath 43 and the conducting cores 44.

After passing through the gland 1, the cap member 40 can be removed from the cable 42 and thrown away. The gland 1 can then be taken apart to clamp the cable amour between the clamping ring 17 and ferrule 19 in the normal manner.

As will be appreciated, the cap member 40 is an assembly aid which enables the cable 42 to be fed through the gland 1 without causing damage to the seal assembly 28 and is easily removed and disposed of after the cable 42 has passed through the gland for connection of the cable 42 to the electrical equipment.

The cap member 40 can be made of any suitable material having the required flexibility and strength to allow the cap member 40 to be pushed through the gland 1 by the cable 42 without tearing. For example, plastics materials and/or certain paper materials.

The cap member 40 can accommodate a range of cable sizes and reception of larger cable sizes is facilitated by locating the cap member 40 at the end of the ferrule 19.

Although the invention has been described with reference to a gland having an universal, diaphragm type seal for a range of cable sizes, it will be appreciated that the cap member 40 may be employed in other types of glands where it is required to protect components of the gland from damage as the cable is passed through the gland.

I claim:

1. A cable gland comprising:
    a seal for engaging a cable extending through the gland; and
    a flexible cap provided within the gland in a temporary position upstream of said seal in a direction of insertion of the cable through the gland, said cap being adapted to receive an end of the cable during cable installation and being releasable from said temporary position by engagement with the cable end during cable installation such that the cap passes with the cable end through said seal and is removable from the cable end after passage of the cable end through the gland.

2. A cable gland according to claim 1 wherein said cap is adapted for use with cables of different thickness.

3. A cable gland according to claim 1 wherein said cap is resistant to tearing.

4. A cable gland according to claim 1 wherein said cap comprises an open base portion and is provided with an external lip at said open base portion for locating said cap in the gland.

5. A cable gland according to claim 4 wherein said cap comprises a closed head portion and tapers inwardly from said open base portion towards said closed head portion.

6. A cable gland according to claim 1 wherein said seal is adapted for use with cables of different thickness.

7. A cable gland according to claim 6 wherein said seal has a tapered body defining a central aperture for passage of the cable at a narrower end of said tapered body.

8. A cable gland according to claim 7 wherein said aperture comprises a cylindrical bore at the narrower end of said tapered body.

9. A cable gland according to claim 7 wherein said tapered body is provided with a support.

10. A cable gland according to claim 9 wherein said support has a central opening aligned with said aperture in said seal.

11. A cable gland according to claim 1 wherein clamping means is provided for clamping cable armour within the gland.

12. A cable gland according to claim 11 wherein said clamping means comprises a pair of clamping members defining opposed taper surfaces for clamping cable armour therebetween.

13. A cable gland according to claim 12 wherein said clamping members are urged into clamping engagement by threaded engagement of two gland members.

14. A cable gland according to claim 13 wherein an external boot seal mounted on one of said gland members is engageable with a second one of said gland members to protect said threaded engagement.

15. A cable gland according to claim 12 wherein said cap is located in said temporary position within the gland by engagement with one of said clamping members.

16. A cable gland according to claim 15 wherein said one clamping member comprises a tubular body having a first end and a second end spaced from said first end in the direction of insertion of the cable from said first end to said second end, said cap being located in said temporary position at said first end and extending within said tubular body towards said second end, and said seal being arranged at said second end whereby said cap is released from said temporary position by engagement with the cable end and passes with the cable end through said tubular body and said seal.

17. A cable gland according to claim 1 wherein said cap is made of plastic material.

18. A cable gland according to claim 1 wherein said cap is made of paper material.

19. An assembly aid for a cable gland comprising:

a flexible cap having a first end and a second end remote from said first end, said first end being open for receiving an end of a cable and adapted for locating said cap in the gland in a temporary position upstream of a gland seal in a direction of insertion of the cable, and said second end being closed for engagement with the cable end during cable installation whereby said cap is released from said temporary position and passes with the cable through the gland seal during assembly of the gland to protect said gland seal and said cap being removable from the cable end after insertion of the cable through the gland.

20. A method of assembling a cable gland comprising:

providing a flexible cap for an end of a cable;

temporarily locating said cap in said gland upstream of a gland seal in a direction of insertion of said cable through said gland;

inserting said cable end through said gland to cause said cable end to engage and release said cap from said temporary location such that said cap passes with said cable end through said gland seal; and removing said cap from said cable end after passage of said cable end through said gland.

* * * * *